(12) United States Patent
Nemoto

(10) Patent No.: US 7,192,014 B2
(45) Date of Patent: Mar. 20, 2007

(54) ACTIVE VIBRATION ISOLATION SUPPORT SYSTEM

(75) Inventor: Hirotomi Nemoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/071,997

(22) Filed: Mar. 4, 2005

(65) Prior Publication Data

US 2005/0206055 A1  Sep. 22, 2005

(30) Foreign Application Priority Data

Mar. 11, 2004  (JP)  ............................. 2004-068512

(51) Int. Cl.
*F16F 9/53* (2006.01)
(52) U.S. Cl. ..................... 267/140.14; 267/140.15
(58) Field of Classification Search ..................
267/140.13–140.15
See application file for complete search history.

(56) References Cited

U.S. PATENT DOCUMENTS

| | | | |
|---|---|---|---|
| 5,762,295 A * | 6/1998 | McGuire et al. ............ | 244/54 |
| 5,947,456 A * | 9/1999 | Aoki ...................... | 267/140.14 |
| 6,422,546 B1 * | 7/2002 | Nemoto et al. ........... | 267/140.14 |
| 6,491,290 B2 * | 12/2002 | Muramatsu et al. ... | 267/140.14 |
| 6,527,262 B2 * | 3/2003 | Hagino et al. .......... | 267/140.14 |
| 2002/0053764 A1 * | 5/2002 | Goto et al. .............. | 267/140.14 |
| 2003/0030203 A1 * | 2/2003 | Nemoto .................. | 267/140.14 |

FOREIGN PATENT DOCUMENTS

JP    2003-113892    4/2003

* cited by examiner

*Primary Examiner*—Christopher P. Schwartz
(74) *Attorney, Agent, or Firm*—Carrier, Blackman & Associates, P.C.; William D. Blackman; Joseph P. Carrier

(57) ABSTRACT

An active vibration isolation support system, supplies current to a coil of an actuator according to the vibrational state of an engine, so that the actuator moves out and back a movable member to which an elastic body is connected. The elastic body is then deformed to change the capacity of a liquid chamber, thereby exerting vibration isolation function. Even if the pressure in a sealed internal space of an actuator case is changed due to the moving out and back of the movable member, the current is variably supplied to the coil of the actuator according to such a change in the pressure of the internal space, thereby controlling the thrust of the movable member so as to be constant. Therefore, the movable member is appropriately driven without receiving the influence of the change of the pressure in the sealed internal space of the actuator case, thereby exerting full performance of the active vibration isolation support system.

20 Claims, 6 Drawing Sheets

ACTIVE VIBRATION ISOLATION SUPPORT SYSTEM

RELATED APPLICATION DATA

The Japanese priority application No. 2004-68512 upon which the present application is based is hereby incorporated in its entirety herein by reference.

BACKGROUND OF THE INVENTION

1. Field of the Invention

The present invention relates to an active vibration isolation support system that includes an elastic body that receives a load from a vibrating body, a liquid chamber having a wall of which at least a part is Conned from the elastic body, an actuator that moves a moveable core out and back by the actuator receiving a supply of current according to the vibrational state of the vibrating body, a movable member that is moved out and back by the movable core of the actuator so as to change the capacity of the liquid chamber, and a controller which controls the current that is supplied to the actuator.

2. Description of the Related Art

An active vibration isolation support system is known from Japanese Patent Application Laid-open No. 2003-113892.

This active vibration isolation support system calculates a crank angular velocity from a time interval between crank pulses output every time a crankshaft rotates through a predetermined angle, calculates a crankshaft torque from a crank angular acceleration obtained by differentiating the crank angular velocity with respect to time, estimates an engine vibrational state as a variation in the torque, and controls the supply of current to a coil of the actuator according to the engine vibrational state, thus exhibiting a vibration isolation function.

When the internal space of an actuator case housing the actuator is sealed in order to substantially prevent water or dust from entering the interior of the actuator case, the internal pressure changes accompanying the moving out and back of the movable member, which forms a part of a wall around the internal space, caused by the actuator. For example, by energizing the coil of the actuator so as to move the movable member toward the inside of the actuator case, the pressure of the internal space of the actuator case increases, and this increase in pressure might interfere with movement of the movable member. Therefore, even if the control means controls the current supplied to the coil of the actuator in order to generate a predetermined thrust for the movable member, the target thrust cannot be generated because of the variation in pressure of the internal space of the actuator case, so that the active vibration isolation support system might not be able to exhibit a desired performance.

SUMMARY OF THE INVENTION

The present invention has been accomplished under the above-mentioned circumstances, and it is an object thereof to prevent the thrust of the movable member from varying as a result of changes in the pressure of the internal space of the sealed actuator case of the active vibration isolation support system.

In order to attain this object, in accordance with a first aspect of the present invention, there is provided an active vibration isolation support system that includes an elastic body that receives a load from a vibrating body, a liquid chamber having a wall of which at least a part is formed from the elastic body, an actuator that moves a movable member out and back by receiving a supply of current according to the vibrational state of the vibrating body, a movable member that is moved out and back by the actuator so as to change the capacity of the liquid chamber, and a controller which controls the current that is supplied to the actuator, the pressure of a sealed internal space of the actuator being changed by the movable member moving out and back, wherein the controller controls the thrust of the movable member so as to be substantially constant by supplying current to the actuator according to a change in the pressure of the internal space.

A first elastic body 19 of an embodiment corresponds to the elastic body of the present invention, first and second liquid chambers 30 and 31 of the embodiment correspond to the liquid chamber of the present invention, an engine of the embodiment corresponds to the vibrating body of the present invention, and an electronic control unit U of the embodiment corresponds to the controller of the present invention.

In accordance with the arrangement of the first aspect, when a vibration isolation function is exhibited by changing the capacity of the liquid chamber by means of the movable member that is moved out and back by the actuator by supplying current corresponding to the vibrational state of the vibrating body to the actuator, even if the pressure of the sealed internal space of the actuator changes as a result of the movable member moving out and back, since the thrust of the movable member is controlled so as to be constant by supplying current to the actuator according to the change in the pressure, it is possible to drive the movable member appropriately, thus making the active vibration isolation support system exhibit its full performance.

The above-mentioned object, other objects, characteristics, and advantages of the present invention will become apparent from an explanation of a present embodiment that will be described in detail below by reference to the attached drawings.

BRIEF DESCRIPTION OF THE DRAWINGS

FIG. 1 is a vertical sectional view of an active vibration isolation support system;

FIG. 2 is an enlarged view of part 2 of FIG. 1;

FIG. 3 is a flow chart for explaining the operation of the embodiment,

FIG. 4 is a graph showing the relationship between an air gap and the thrust of an actuator.

DESCRIPTION OF THE PRESENT EMBODIMENT

Figure 1:
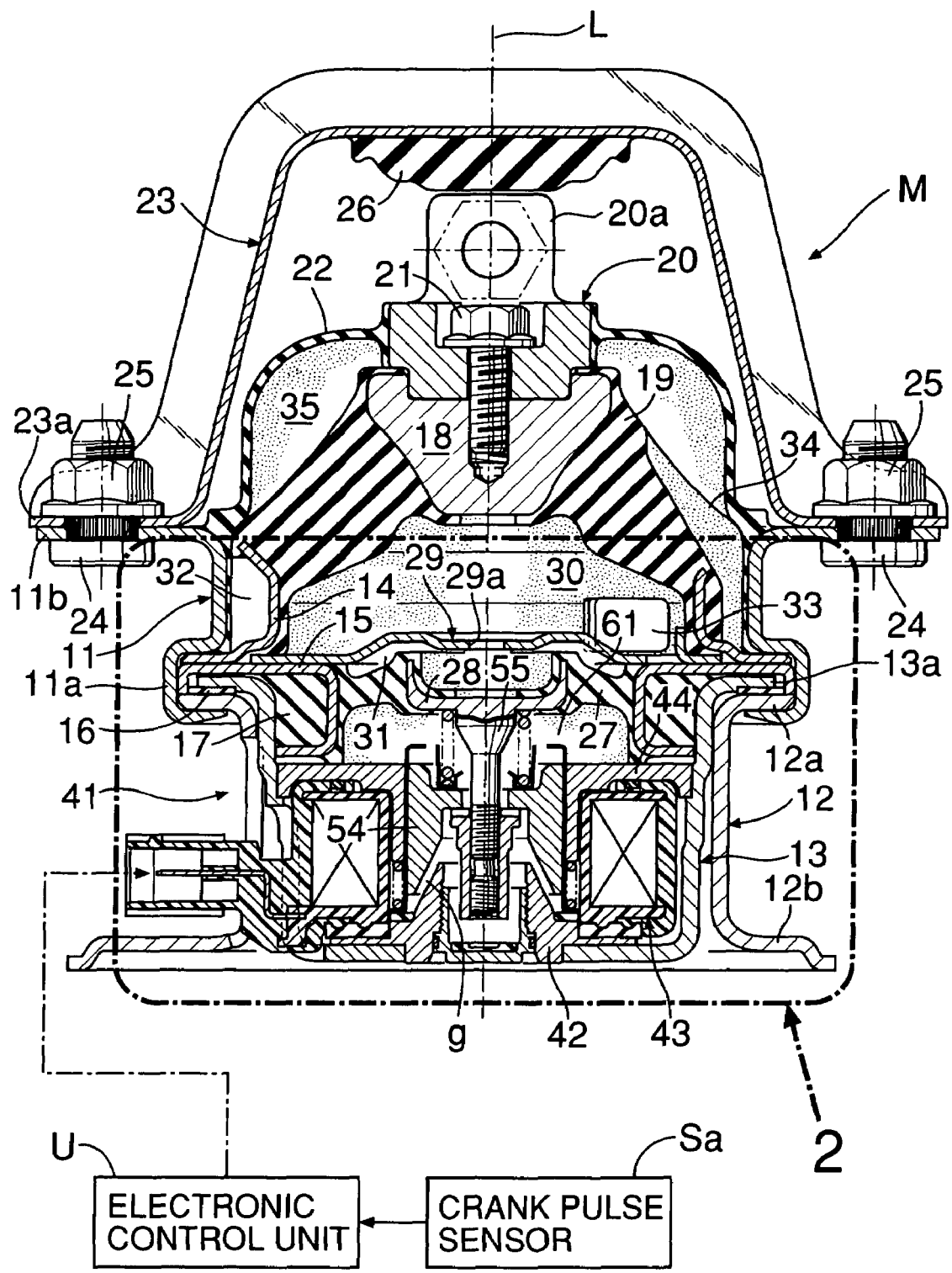
FIG. 1 to FIG. 4 show one embodiment of the present invention.
Figure 2:
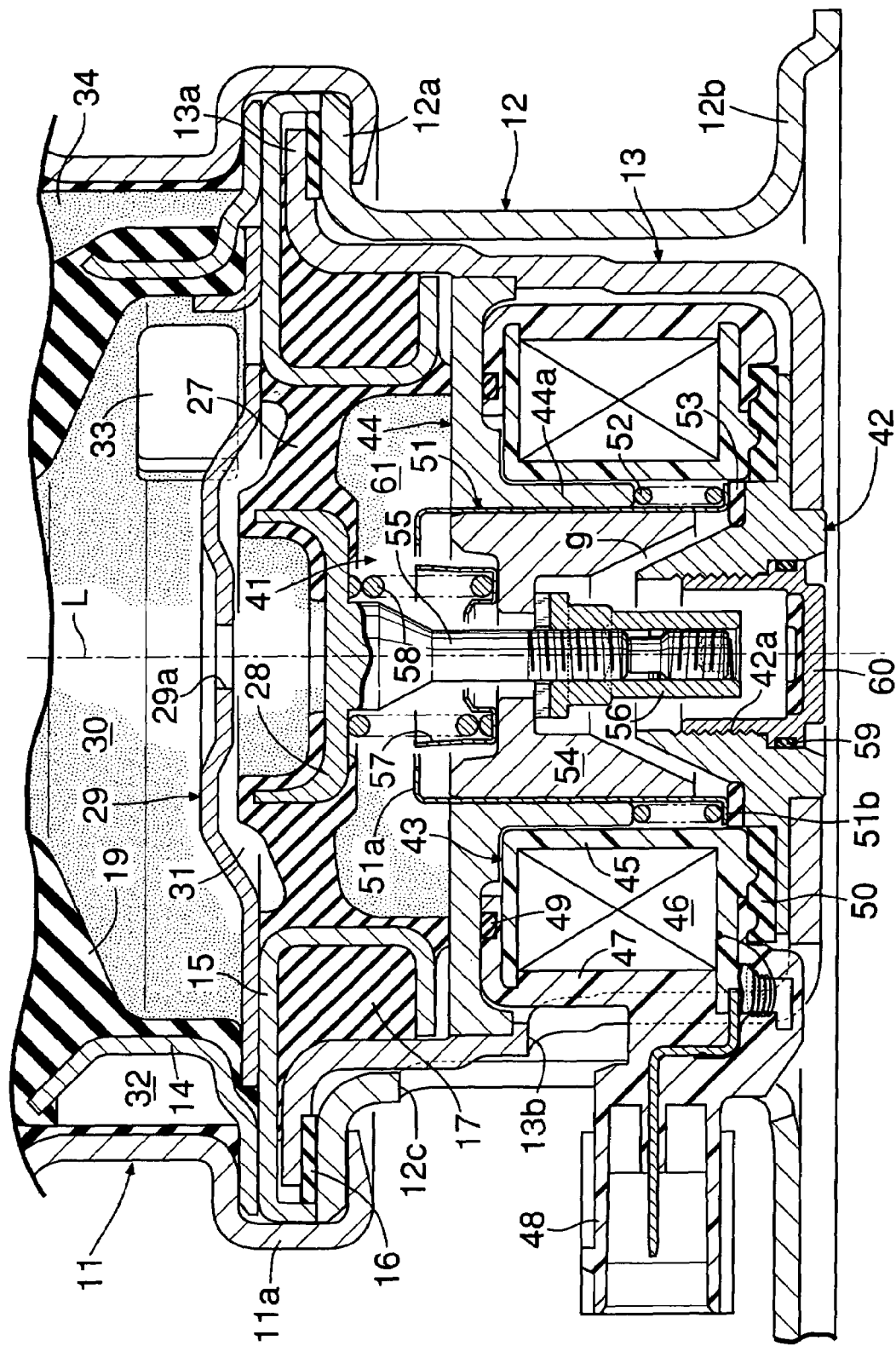

Referring to FIG. 1 and FIG. 2, an active vibration isolation support system M (active control mount) for elastically supporting an automobile engine in a vehicle body frame has a structure that is substantially symmetrical with respect to an axis L, in which, between a flange portion 11a at the lower end of a substantially cylindrical upper housing 11 and a flange portion 12a at the upper end of a substantially cylindrical lower housing 12, a flange portion 13a on the outer periphery of an upwardly opening substantially cup-shaped actuator case 13, an outer peripheral portion of an annular first elastic body support ring 14, and an outer peripheral portion of an annular second elastic body support ring 15 are superimposed and joined by crimping. In this process, an annular first floating rubber 16 is disposed between the flange portion 12a of the lower housing 12 and the flange portion 13a of the actuator case 13, and an annular second floating rubber 17 is disposed between an upper part of the actuator case 13 and an inner face of the second elastic body support ring 15, so that the actuator case 13 is floatingly supported such that it can move relative to the upper housing 11 and the lower housing 12.

Joined by vulcanization bonding to the first elastic body support ring 14 and a first elastic body support boss 18 disposed on the axis L, are the lower end and the upper end of a first elastic body 19 made of a thick rubber. A diaphragm support boss 20 is fixed to an upper face of the first elastic body support boss 18 by a bolt 21. An outer peripheral portion of a diaphragm 22 whose inner peripheral portion is joined by vulcanization bonding to the diaphragm support boss 20, is joined by vulcanization bonding to the upper housing 11. An engine mounting portion 20a integrally formed with an upper face of the diaphragm support boss 20 is fixed to the engine (not illustrated). A vehicle body mounting portion 12b at the lower end of the lower housing 12 is fixed to the vehicle body frame (not illustrated).

A flange portion 23a at the lower end of a stopper member 23 is joined by bolts 24 and nuts 25 to a flange portion 11b at the upper end of the upper housing 11. The engine mounting portion 20a projectingly provided on the upper face of the diaphragm support boss 20 faces a stopper rubber 26 attached to an upper inner face of the stopper member 23 so that the engine mounting portion 20a can abut against the stopper rubber 26. When a large load is input to the active vibration isolation support system M, the engine mounting portion 20a abuts against the stopper rubber 26, thereby suppressing excessive displacement of the engine.

An outer peripheral portion of a second elastic body 27 made of a membranous rubber is joined by vulcanization bonding to the second elastic body support ring 15. A movable member 28 is embedded in and joined by vulcanization bonding to a central portion of the second elastic body 27. A disc-shaped partition member 29 is fixed between an upper face of the second elastic body support ring 15 and the outer peripheral portion of the first elastic body 19. A first liquid chamber 30 defined by the partition member 29 and the first elastic body 19, and a second liquid chamber 31 defined by the partition member 29 and the second elastic body 27, communicate with each other via a through hole 29a formed in the middle of the partition member 29.

An annular through passage 32 is formed between the first elastic body support ring 14 and the upper housing 11. One end of the through passage 32 communicates with the first liquid chamber 30 via a through hole 33, and the other end of the through passage 32 communicates via a through hole 34 with a third liquid chamber 35 defined by the first elastic body 19 and the diaphragm 22.

The structure of an actuator 41 for driving the movable member 28 is now explained.

Mounted within the actuator case 13 in sequence from the bottom to the top are a stationary core 42, a coil assembly 43, and a yoke 44. The coil assembly 43 is formed from a bobbin 45 disposed on the outer periphery of the stationary core 42, a coil 46 wound around the bobbin 45, and a coil cover 47 covering the outer periphery of the coil 46. The coil cover 47 is formed integrally with a connector 48 running through openings 13b and 12c formed in the actuator case 13 and the lower housing 12 and extending outward.

A seal 49 is disposed between an upper face of the coil cover 47 and a lower face of the yoke 44. A seal 50 is disposed between a lower face of the bobbin 45 and an upper face of the stationary core 42. These seals 49 and 50 can prevent water or dust from entering an internal space 61 of the actuator 41 via the openings 13b and 12c formed in the actuator case 13 and the lower housing 12.

A thin cylindrical bearing member 51 is fitted, in a vertically slidable manner, into an inner peripheral face of a cylindrical portion 44a of the yoke 44. An upper flange 51a and a lower flange 51b are formed at the upper end and the lower end respectively of the bearing member 51, the upper flange 51a being bent radially inward, the lower flange 51b being bent radially outward. A set spring 52 is disposed in a compressed state between the lower flange 51b and the lower end of the cylindrical portion 44a of the yoke 44. The bearing member 51 is supported by the yoke 44 by the lower flange 51b being pressed against the upper face of the stationary core 42 via an elastic body 53 by means of the elastic force of the set spring 52.

A substantially cylindrical movable core 54 is fitted, in a vertically slidable manner, into an inner peripheral face of the bearing member 51. A rod 55 extending downward from the center of the movable member 28 runs loosely through the center of the movable core 54, and a nut 56 is tightened around the lower end of the rod 55. A set spring 58 is disposed in a compressed state between a spring seat 57 provided on an upper face of the movable core 54 and a lower face of the movable member 28. The movable core 54 is fixed by being pressed against the nut 56 by means of the elastic force of the set spring 58. In this state, the lower face of the movable core 54 and the upper face of the stationary core 44 face each other across a conical air gap g. The rod 55 and the nut 56 are loosely fitted into an opening 42a formed in the center of the stationary core 42, and this opening 42a is blocked by a plug 60 via a seal 59.

A crank pulse sensor Sa for detecting a crank pulse output accompanying rotation of a crankshaft of the engine is connected an electronic control unit U, which controls the supply of current to the actuator 41 of the active vibration isolation support system M. The crank pulse output of the engine is 24 times per revolution of The crankshaft, that is, once every 15° of crank angle.

The operation of the embodiment of the present invention having the above-mentioned arrangement is now explained.

When low frequency engine shake vibration occurs while the automobile is traveling, the first elastic body 19 is deformed by a load input from the engine via the diaphragm support boss 20 and the first elastic body support boss 18, thus changing the capacity of the first liquid chamber 30, so that a liquid moves to and fro between the first liquid chamber 30 and the third liquid chamber 35 via the through passage 32. When the capacity of the first liquid chamber 30 increases/decreases, the capacity of the third liquid chamber 35 decreases/increases correspondingly, and this change in the capacity of the third liquid chamber 35 is absorbed by elastic deformation of the diaphragm 22. The shape and the dimensions of the through passage 32 and the spring constant of the first elastic body 19 are set so that a low spring constant and high attenuation force are exhibited in the frequency region of the engine shake vibration. Therefore, it is possible to effectively suppress the vibration transmitted from the engine to the vehicle body frame.

In the frequency region of the engine shake vibration, the actuator 41 is maintained in a non-operating state.

When there is vibration having a higher frequency than that of the above-mentioned engine shake vibration, that is, vibration during idling or vibration during cylinder cut-off due to rotation of the engine crankshaft, the liquid within the through passage 32 providing communication between the first liquid chamber 30 and the third liquid chamber 35 becomes stationary and a vibration isolation function cannot be exhibited; the actuator 41 is therefore driven to exhibit a vibration isolation function.

In order to operate the actuator 41 of the active vibration isolation support system M to exhibit the vibration isolation function, the electronic control unit U controls the supply of current to the coil 46 based on a signal from the crank pulse sensor Sa.

Figure 3:
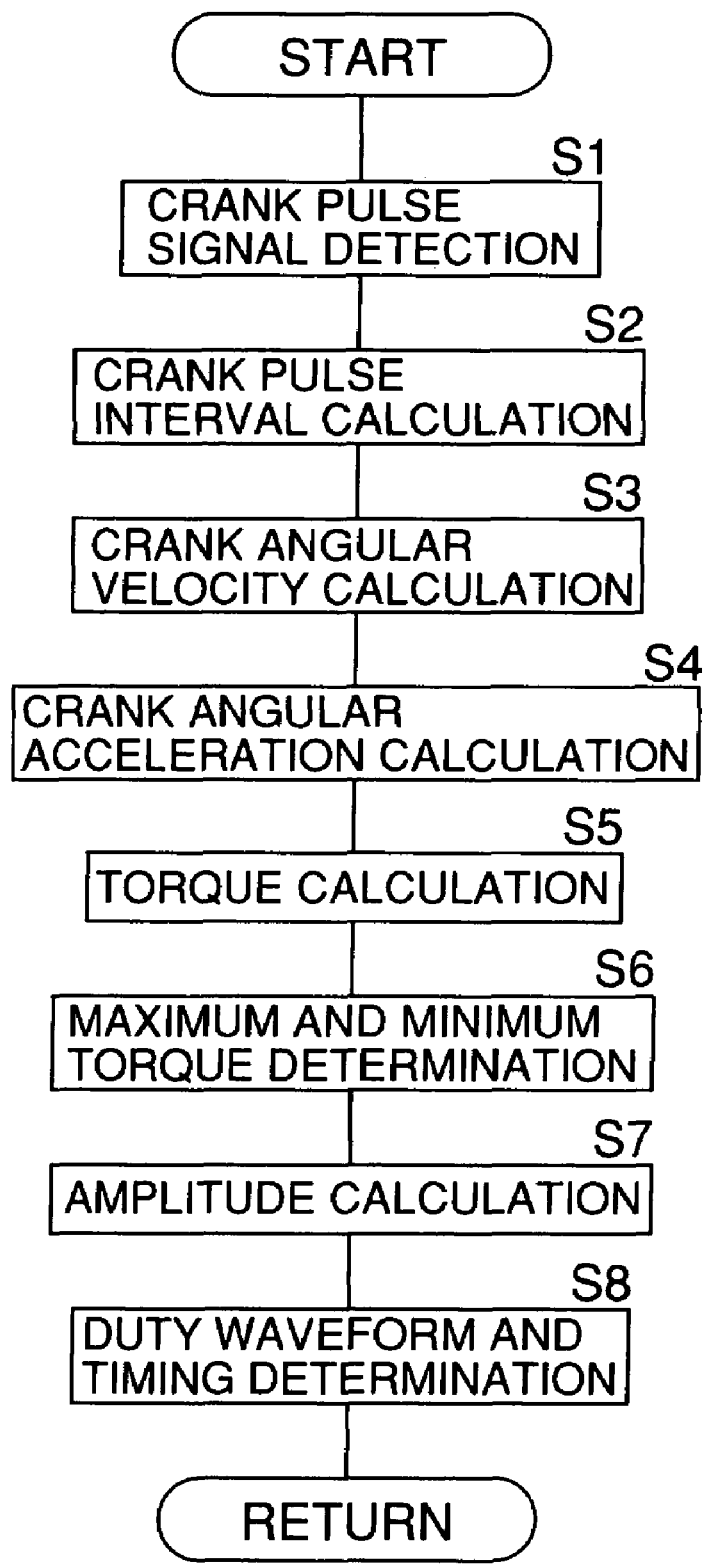
Figure 4:
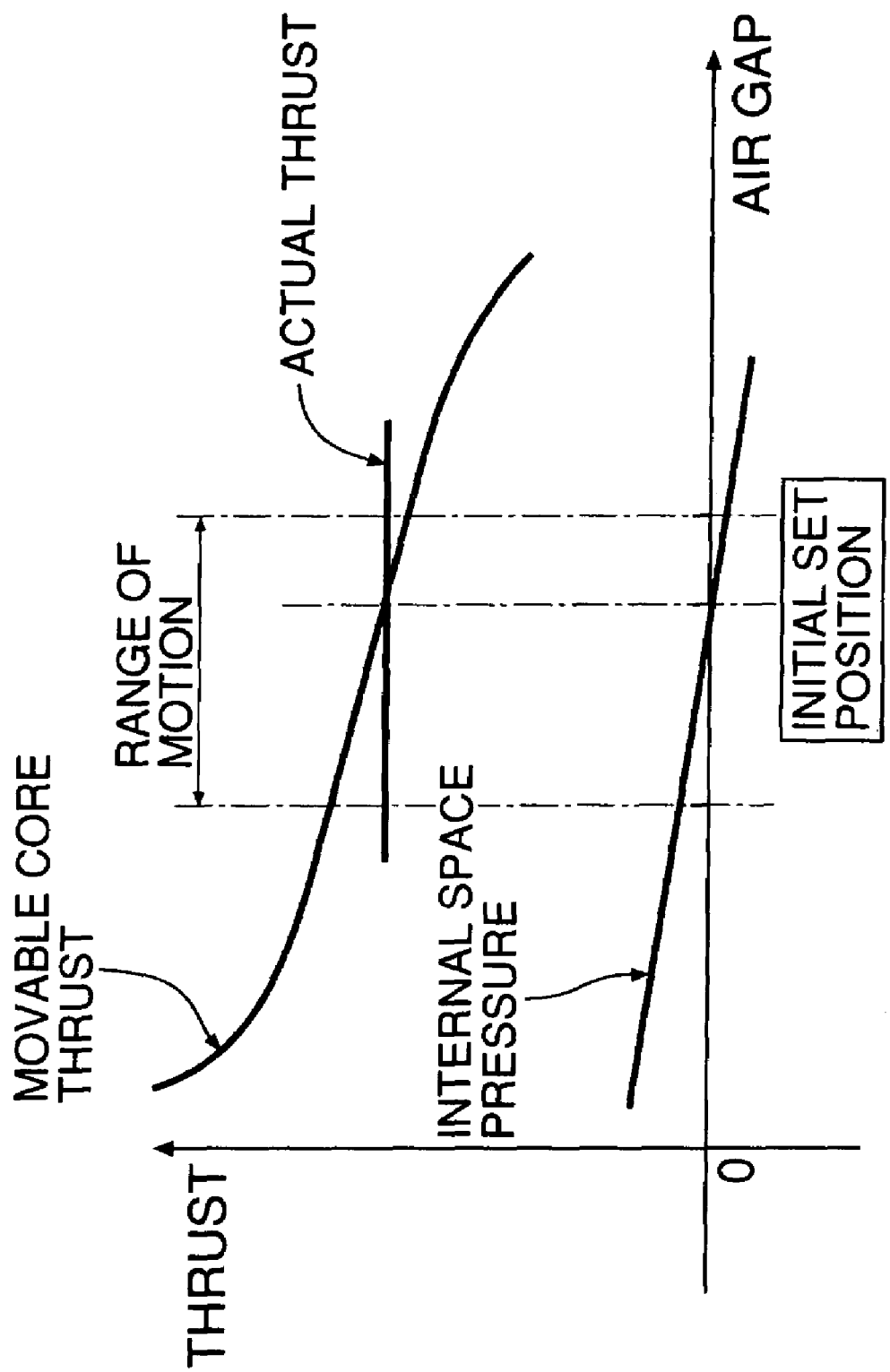

That is, in the flow chart of FIG. 3, firstly in step S1, crank pulses output from the crank pulse sensor Sa every 15° of crank angle are read in. In step S2, the crank pulses thus read in are compared with a reference crank pulse (TDC signal of a specified cylinder) so as to calculate a time interval between the crank pulses. In step S3, a crank angular velocity ω is calculated by dividing the 15° crank angle by the time interval between the crank pulses. In step S4, a crank angular acceleration dω/dt is calculated by differentiating the crank angular velocity ω with respect to time. In step S5, a torque Tq around the engine crankshaft is calculated from $$Tq = I \times d\omega/dt,$$

where I is the moment of inertia around the engine crankshaft. This torque Tq becomes 0 if it is assumed that the crankshaft rotates at a constant angular velocity ω, but in an expansion stroke the angular velocity ω increases by acceleration of a piston, and in a compression stroke the angular velocity ω decreases by deceleration of the piston, thus generating a crank angular acceleration dω/dt; as a result a torque Tq that is proportional to the crank angular acceleration dω/dt is generated.

In step S6, a maximum value and a minimum value of two successive torque values are determined. In step S7, amplitude at the position of the active vibration isolation support system M supporting the engine is calculated as the difference between the maximum value and the minimum value of the torque, that is, a torque variation. In step S8, a duty waveform and timing (phase) of current applied to the coil 46 of the actuator 41 are determined.

When the engine moves downward relative to the vehicle body frame and the first elastic body 19 is deformed downwardly thereby decreasing the capacity of the first liquid chamber 30, energizing the coil 46 of the actuator 41 with matching timing allows the movable core 54 to move downward toward the stationary core 42 by means of the attractive force generated in the air gap g, and the second elastic body 27 is deformed downwardly by being drawn by the movable member 28 connected to the movable core 54 via the rod 55. As a result, the capacity of the second liquid chamber 31 increases, so that the liquid in the first liquid chamber 30 which is compressed by the load from the engine, passes through the through hole 29a of the partition member 29 and flows into the second liquid chamber 31, thereby reducing the load transmitted from the engine to the vehicle body frame.

Subsequently, when the engine moves upward relative to the vehicle body frame and the first elastic body 19 is deformed upwardly thereby increasing the capacity of the first liquid chamber 30, de-energizing the coil 46 of the actuator 41 with matching timing allows the attractive force generated in the air gap g to disappear and the movable core 54 to move freely, so that the second elastic body 27 that has been deformed downwardly recovers upwardly by its own elastic recovery force. As a result, the capacity of the second liquid chamber 31 decreases, and the liquid in the second liquid chamber 31 passes through the through hole 29a of the partition member 29 and flows into the first liquid chamber 30, thereby allowing the engine to move upward relative to the vehicle body frame.

In this way, by energizing and de-energizing the coil 46 of the actuator 41 in accordance with the engine vibration cycle, it is possible to generate an active damping force for preventing the engine vibration from being transmitted to the vehicle body frame.

When the coil 46 of the actuator 41 is energized, the movable core 54 is attracted downward, thereby reducing the air gap g. In order to maintain the thrust for attracting the movable core 54 at a constant value even when the air gap g changes, the current supplied to the coil 46 is controlled. That is, since the thrust increases as the air gap g decreases even when the current supplied to the coil 46 is constant, by reducing the current supplied to the coil 46 accompanying a decrease in the air gap g, it is possible, as shown in FIG. 5, to maintain the thrust at a constant value over a predetermined range of motion across the air gap g.

However, since the upper face of the cup-shaped actuator case 13 housing the actuator 41 is blocked by the second elastic body 27, the opening 13b in the side face is sealed by the seals 49 and 50, and the opening 42a of the stationary core 42 fixed to the base is sealed by the seal 59, the internal space 61 of the actuator case 13 becomes a sealed space isolated from the atmosphere outside the actuator case. If the coil 46 is energized in this state so as to move the second elastic body 27 downward, when the air gap decreases accompanying the downward movement, the pressure of the internal space 61 becomes high.

Figure 5:
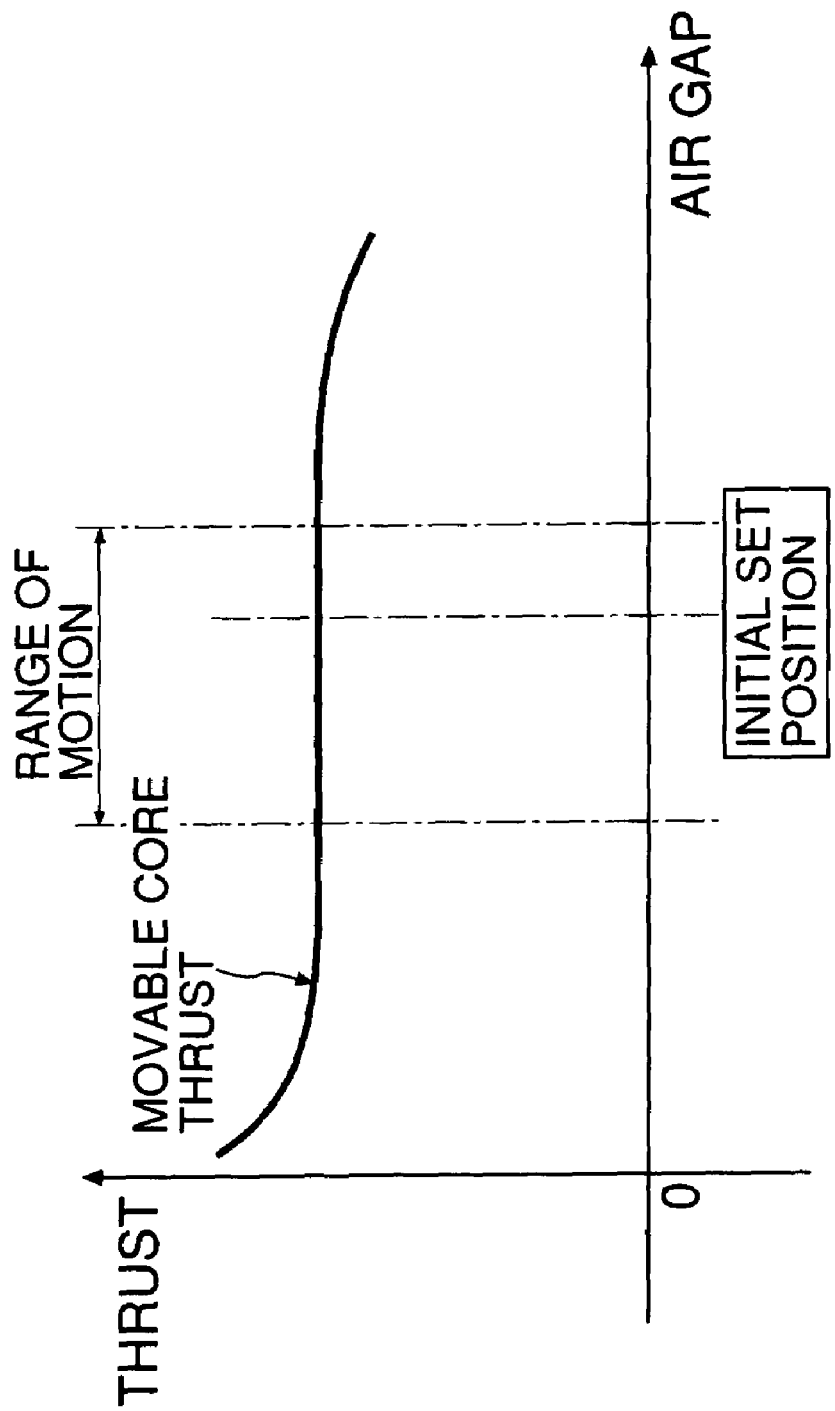
FIG. 5 is a graph showing the relationship between the air gap and the thrust when an internal space of the actuator is open (Prior Art)
Figure 6:
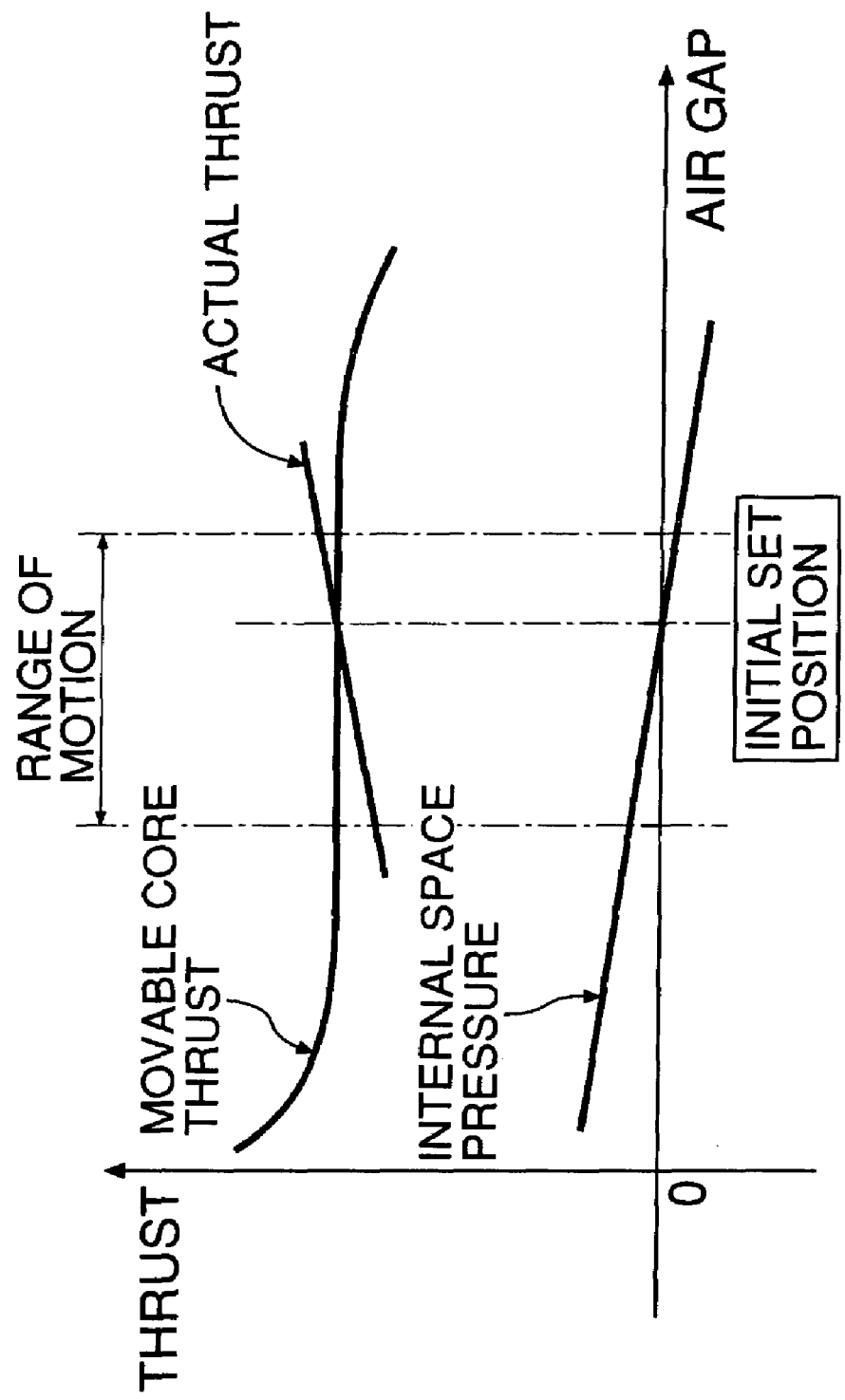
FIG. 6 is a graph showing the relationship between the air gap and the thrust when the internal space of the actuator is closed (Prior Art).

In this way, when the pressure of the internal space 61 becomes high as the second elastic body 27 moves downward due to energization of the coil 46, the increase in pressure of the internal space 61 works so as to prevent the second elastic body 27 from moving downward, and if the same current as a case explained in FIG. 5 is supplied to the coil 46, as shown in FIG. 6 the actual thrust does not become a constant value, leading to a possibility that, when the air gap g is small in the range of motion, the thrust might become insufficient.

In the present embodiment, the current supplied to the coil 46 is feedforward controlled so that the thrust of the movable member 28 increases accompanying a decrease in the air gap g detected by a position sensor (not illustrated). As a result, even when the thrust decreases due to an increase in the pressure of the internal space 61 accompanying a decrease in the air gap g, the decrease in thrust can be counterbalanced by an increase in the current, thus maintaining the actual thrust at a constant value in the range of motion to make the active vibration isolation support system M exhibit its full performance.

Although an embodiment of the present invention has been described in detail above, the present invention can be modified in a variety of ways without departing from the spirit and scope of the present invention.

For example, in the embodiment the active vibration isolation support system M for supporting the engine of an automobile is illustrated, but the active vibration isolation support system M of the present invention is applicable to support for any vibrating body other than engines.

Furthermore, in the embodiment, since the position of the movable member 28 (that is, the size of the air gap g) correlates with the pressure of the internal space 61 of the actuator 41, the thrust of the movable member 28 is maintained at a constant value by feedforward controlling the current of the coil 46 according to the size of the air gap g detected by the position sensor, but the current of the coil 46 may be feedforward controlled according to the pressure of the internal space 61 of the actuator 41 directly detected by a pressure sensor.

What is claimed is:

1. An active vibration isolation support system comprising:
   an elastic body that receives a load from a vibrating body;
   a liquid chamber having a wall of which at least a part is formed from the elastic body;
   an actuator having a moveable core that moves out and back by the actuator receiving a supply of current according to a vibrational state of the vibrating body, the actuator having a sealed internal space formed therein;
   a movable member that is moved out and back by the moveable core of the actuator so as to change the capacity of the liquid chamber; and
   a controller which controls the current that is supplied to the actuator; wherein
   pressure of the sealed internal space of the actuator is changed by the movable member moving out and back,
   wherein said sealed internal space of the actuator is defined on a side of said movable member opposite the side at which said liquid chamber is defined, and said movable core is in fluid communication with said sealed internal space, and
   the controller controls the thrust of the movable member so as to be substantially constant by supplying current to the actuator according to a change in the pressure of the sealed internal space,
   wherein the controller increases the current that is supplied to the actuator in order to counterbalance a decrease in thrust generated by an increase in the pressure of the sealed internal space which is caused by a movement of the movable member.

2. The active vibration isolation support system according to claim 1, wherein the vibrating body is an engine, and the controller controls supply of current to the actuator according to a vibrational state of the engine to exhibit a vibration isolation function.

3. The active vibration isolation support system according to claim 1, wherein the controller controls supply of current to the actuator according to a vibrational state of the vibrating body to exhibit a vibration isolation function.

4. The active vibration isolation support system according to claim 1, wherein the sealed internal space of the actuator is isolated from atmosphere outside of the actuator.

5. The active vibration isolation support system according to claim 1, wherein the controller controls supply of current to the actuator in a feedforward control manner.

6. The active vibration isolation support system according to claim 1, wherein:
   the moveable core has a substantially conical opening formed in a lower end thereof,
   the actuator further comprises a stationary core disposed below the moveable core and comprising an upwardly extending boss which extends into the substantially conical opening of the moveable core,
   the moveable core and the stationary core cooperate to define a substantially conical air gap therebetween, and
   the controller determines the pressure in the internal space based on a size of the air gap provided between the stationary core and the movable core of the actuator.

7. The active vibration isolation support system according to claim 1, wherein said movable core is disposed within said sealed internal space.

8. An active vibration isolation support system comprising:
   an elastic body that receives a load from a vibrating body;
   a liquid chamber having a wall of which at least a part is formed from the elastic body;
   an actuator having a movable core that is reciprocally moved according to the vibrational state of the vibrating body, the actuator having a sealed internal space formed therein;
   a movable member that is reciprocally moved by the movable core of the actuator so as to change capacity of the liquid chamber; and
   a controller which operatively controls movement of the movable core by controlling current that is supplied to the actuator;
   wherein
   pressure of the sealed internal space of the actuator is changed by movements of the movable member;
   wherein said sealed internal space of the actuator is defined on a side of said movable member opposite the side at which said liquid chamber is defined, and said movable core is in fluid communication with said sealed internal space,
   the controller controls supply of current to the actuator according to a vibrational state of the vibrating body to exhibit a vibration isolation function; and
   the controller further controls the thrust of the movable member so as to be substantially constant by supplying the current to the actuator according to a change in the pressure in the sealed internal space,
   wherein the controller increases the current that is supplied to the actuator in order to counterbalance a decrease in thrust generated by an increase in the pressure of the sealed internal space which is caused by a movement of the movable member.

9. The active vibration isolation support system according to claim 8, wherein the sealed internal space of the actuator is isolated from atmosphere outside of the actuator.

10. The active vibration isolation support system according to claim 8, wherein the controller controls supply of current to the actuator in a feedforward control manner.

11. The active vibration isolation support system according to claim 8, wherein:
    the moveable core has a substantially conical opening formed in a lower end thereof,
    the actuator further comprises a stationary core disposed below the moveable core and comprising an upwardly extending boss which extends into the substantially conical opening of the moveable core,
    the moveable core and the stationary core cooperate to define a substantially conical air gap therebetween, and
    the controller determines the pressure in the internal space based on a size of the air gap provided between the stationary core and the movable core of the actuator.

12. The active vibration isolation support system according to claim 8, wherein the vibrating body is an engine.

13. An active vibration isolation support system comprising:
- an elastic body for receiving a load from a vibrating body;
- a liquid chamber having a wall of which at least a part is formed from the elastic body;
- an actuator case for housing an actuator;
- a sealed internal space formed within the actuator case;
- the actuator having a reciprocally movable core according to a vibrational state of the vibrating body;
- a movable member which is reciprocally moved by the movable core of the actuator for changing capacity of the liquid chamber; and
- a controller for operatively moving the movable core by controlling supply of current to the actuator;

wherein
pressure of the sealed internal space of the actuator is changed by movements of the movable member;
wherein said sealed internal space of the actuator is defined on a side of said movable member opposite the side at which said liquid chamber is defined, and said movable core is in fluid communication with said sealed internal space,
the controller controls supply of current to the actuator according to a vibrational state of the vibrating body to exhibit a vibration isolation function; and
the controller further controls thrust of the movable member so as to be substantially constant by controlling supply of current to the actuator according to a change in the pressure in the sealed internal space,
wherein the controller increases the current that is supplied to the actuator in order to counterbalance a decrease in thrust generated by an increase in the pressure of the sealed internal space which is caused by a movement of the movable member.

14. The active vibration isolation support system according to claim 13, wherein a downward movement of the movable member increases pressure in the sealed internal space.

15. The active vibration isolation support system according to claim 14, wherein the increase in the pressure in the sealed internal space results in a decrease in thrust.

16. The active vibration isolation support system according to claim 13, wherein an upward movement of the movable member decreases pressure in the sealed internal space.

17. The active vibration isolation support system according to claim 16, wherein the decrease in the pressure in the sealed internal space results in an increase in thrust.

18. The active vibration isolation support system according to claim 13, wherein the actuator case is sealed at plural locations to substantially prevent water and dust from entering therein.

19. The active vibration isolation support system according to claim 13, further comprising a stationary core and wherein a substantially conical air gap is provided between the stationary and movable cores; and a size of the air gap correlates with the pressure in the sealed internal space, and wherein:
- the moveable core has a substantially conical opening formed in a lower end thereof,
- the stationary core is disposed below the moveable core and comprises an upwardly extending boss which extends into the substantially conical opening of the moveable core,
- the moveable core and the stationary core cooperate to define the substantially conical air gap therebetween, and
- the controller determines the pressure in the internal space based on a size of the air gap provided between the stationary core and the movable core of the actuator.

20. The active vibration isolation support system according to claim 13, wherein the sealed internal space is isolated from atmosphere outside of the actuator case.

* * * * *